United States Patent
Roll et al.

(10) Patent No.: US 8,789,313 B2
(45) Date of Patent: Jul. 29, 2014

(54) VEHICLE OUTER BELT MOLDING

(75) Inventors: James R. Roll, Ann Arbor, MI (US); Stephen D. Rusnak, Waterford, MI (US); Robert Connor, Lenox, MI (US); Brian W. Geib, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/361,182

(22) Filed: Jan. 30, 2012

(65) Prior Publication Data
US 2013/0193711 A1     Aug. 1, 2013

(51) Int. Cl.
*B60J 1/16*     (2006.01)

(52) U.S. Cl.
USPC ............................................ 49/377; 49/493.1

(58) Field of Classification Search
USPC .......... 49/372, 374, 377, 489.1, 490.1, 493.1, 49/496.1
See application file for complete search history.

(56) References Cited

U.S. PATENT DOCUMENTS

| | | | | |
|---|---|---|---|---|
| 3,908,312 A * | 9/1975 | Pennec | ........................ | 49/493.1 |
| 4,696,128 A * | 9/1987 | Fukuhara | .................... | 49/492.1 |
| 4,860,494 A * | 8/1989 | Fujii et al. | .................... | 49/493.1 |
| 4,949,507 A * | 8/1990 | Vaughan | ...................... | 49/482.1 |
| 5,363,537 A * | 11/1994 | Schneider et al. | .............. | 24/289 |
| 5,388,371 A * | 2/1995 | Nozaki | ........................... | 49/377 |
| 5,740,640 A * | 4/1998 | Yasuda | ................... | 52/204.597 |
| 6,282,840 B1* | 9/2001 | Vance | .............................. | 49/377 |
| 7,934,341 B2* | 5/2011 | Knight et al. | ................... | 49/377 |
| 2005/0126077 A1* | 6/2005 | Cittadini et al. | ................ | 49/377 |
| 2006/0254149 A1* | 11/2006 | Kanbara et al. | ................ | 49/377 |
| 2007/0227072 A1* | 10/2007 | Kawase et al. | ................. | 49/377 |
| 2007/0227073 A1* | 10/2007 | Tognetti et al. | ................ | 49/377 |

* cited by examiner

*Primary Examiner* — Katherine Mitchell
*Assistant Examiner* — Scott Denion
(74) *Attorney, Agent, or Firm* — Quinn Law Group, PLLC

(57) ABSTRACT

An outer belt molding for a vehicle includes a body portion having a first end and a second end. A cap is disposed at the first end of the body portion, and an anti-rattle bumper is disposed at the second end of the body portion. A window sealing arm is compliantly coupled to the body portion at a location between the cap and the anti-rattle bumper, and forms an acute angle with the first end of the body portion. Additionally, a body sealing arm is compliantly coupled to the window sealing arm and extends toward the body portion.

14 Claims, 2 Drawing Sheets

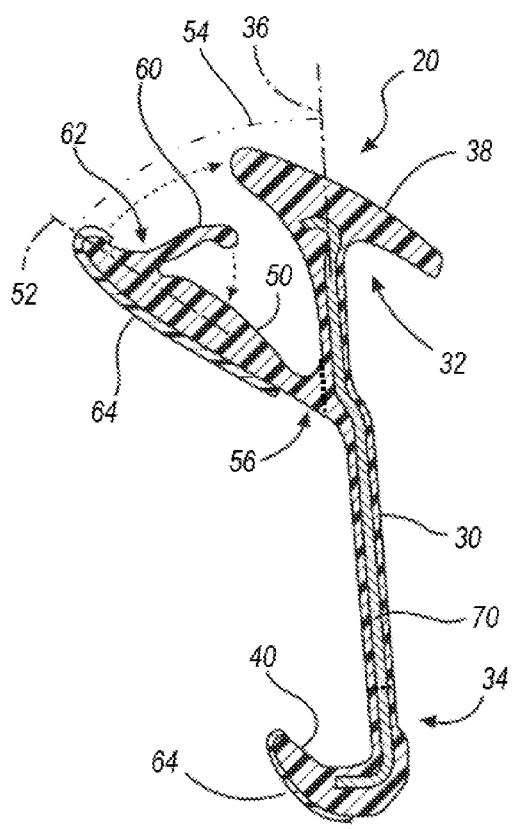
FIG. 3
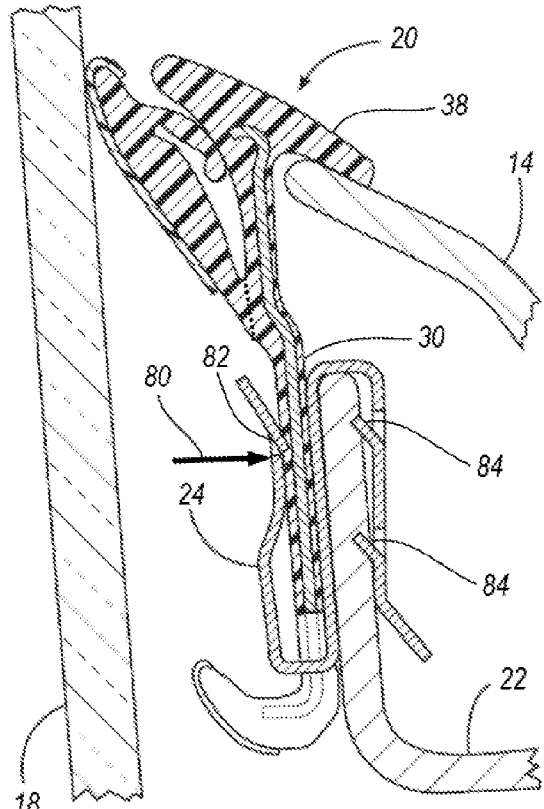
FIG. 4
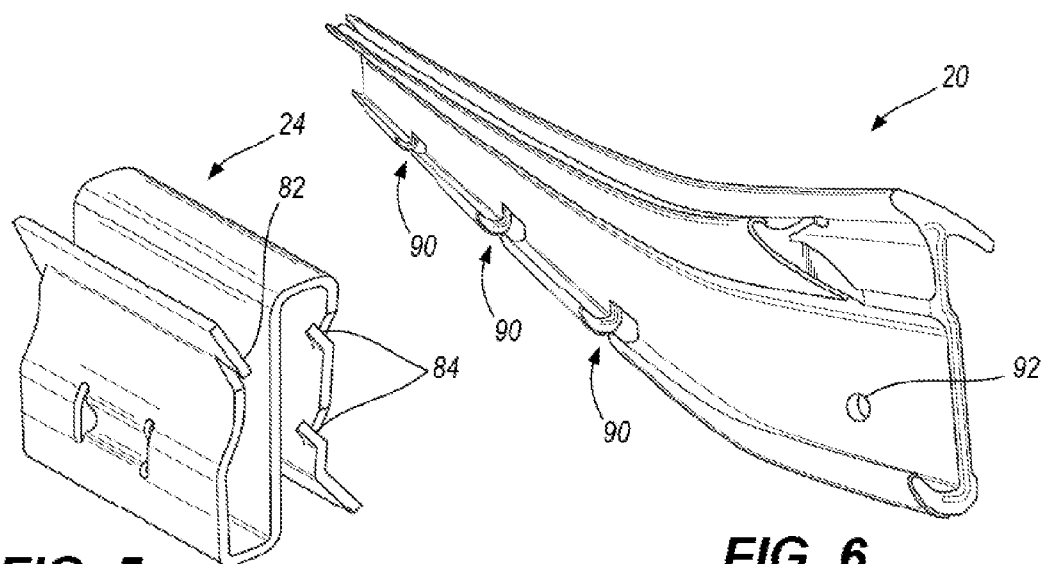
FIG. 5
FIG. 6

VEHICLE OUTER BELT MOLDING

TECHNICAL FIELD

The present invention relates generally to outer belt molding for an automotive vehicle.

BACKGROUND

Outer belt molding is generally used to provide a water-resistant seal between a vehicle door and a window pane that is translatable relative to the door. Belt moldings may generally be configured to channel rain-water and/or exterior liquids away from electronics or other hardware within the door assembly. Additionally, such moldings may channel such exterior liquids away from the window to prevent the window from freezing to the molding in cold weather climates.

SUMMARY

An outer belt molding for a vehicle includes a body portion having a first end and a second end. A cap is disposed at the first end of the body portion, and an anti-rattle bumper is disposed at the second end of the body portion. A window sealing arm is compliantly coupled to the body portion at a location between the cap and the anti-rattle bumper, and forms an acute angle with the first end of the body portion. Additionally, a body sealing arm is compliantly coupled to the window sealing arm and extends toward the body portion.

The window sealing arm is articulable between a first position and a second position relative to the body portion, and the body sealing arm is configured to contact the body portion when the window sealing arm is in the second position. Conversely, the body sealing arm is configured to be separate from the body portion when the window sealing arm is in the first position. Contact between the body sealing arm and the body portion may be configured to urge the body sealing arm to articulate towards the window sealing arm.

In one configuration, the window sealing arm and the body portion may be each formed from a polymeric material. Additionally, the polymeric material of the window sealing arm may have a lower durometer hardness than the polymeric material of the body portion. A metallic carrier may be disposed within the body portion of the outer belt molding to provide further structural rigidity. The metallic carrier may further extend into at least one of the cap and the anti-rattle bumper of the outer belt molding.

Additionally, a vehicle door assembly may include an outer body panel, an upstanding flange disposed on an inward facing side of the outer body panel, and an outer belt molding coupled with the upstanding flange. The door assembly may additionally include a window pane, wherein the window sealing arm of the outer belt molding is configured to contact the window pane. Such contact with the window pane may be configured to urge the window sealing arm to articulate between the first position and a second position relative to the body portion.

In one configuration, the cap of the outer belt molding may be configured to contact and overhang the outer body panel by a predetermined amount.

The door assembly may further include a plurality of clips configured to couple the outer belt molding with the upstanding flange. Each of the plurality of clips may be configured to apply a compressive force to the body portion of the outer belt molding. The plurality of clips may be disposed at spaced intervals along the upstanding flange. Likewise, the anti-rattle bumper of the outer belt molding may be notched at a plurality of locations according to the spaced intervals to allow the clips to contact the body portion.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic cross-sectional view of an outer belt molding.

FIG. 4 is a schematic cross-sectional view of a vehicle door assembly.

FIG. 5 is a schematic perspective view of a clip.

FIG. 6 is a schematic perspective view of an outer belt molding.

DETAILED DESCRIPTION

Figure 1:
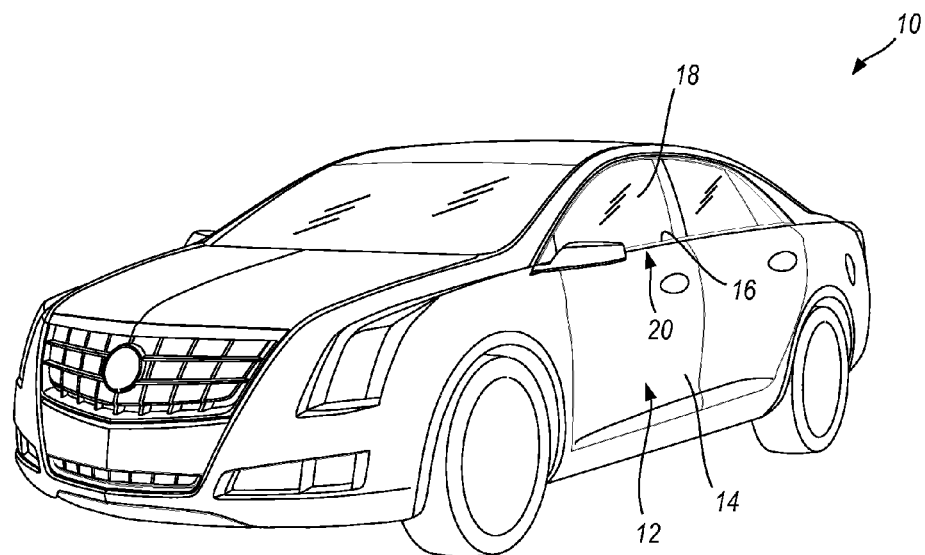
FIG. 1 is a schematic perspective view of a vehicle.

Referring to the drawings, wherein like reference numerals are used to identify like or identical components in the various views, FIG. 1 schematically illustrates a vehicle 10 having at least one vehicle door assembly 12 (i.e., a door assembly 12). The door assembly 12 generally includes at least one outer body panel 14, and at least partially defines a window opening 16. A movable window pane 18 may be in mechanical communication with the door assembly 12, and may selectively transition between a closed state (as shown) and an open state. In the closed state, the window opening 16 may generally be blocked by the window pane 18, while in the open state at least a portion of the window opening 16 may be open or unobstructed. The transition between open and closed may be accomplished by retracting the window pane 18 into the door assembly 12 though a window slot provided on the lower edge of the window opening 16, where the slot is at least partially defined by the outer body panel 14.

As will be discussed in more detail below, an outer belt molding 20 may be coupled with the door assembly 12 and may be adapted to generally inhibit water or other moisture from entering the door assembly 12 adjacent to the window pane 18. Said another way, the outer belt molding 20 may generally seal the opening between the outer body panel 14 and the window pane 18.

Figure 2:
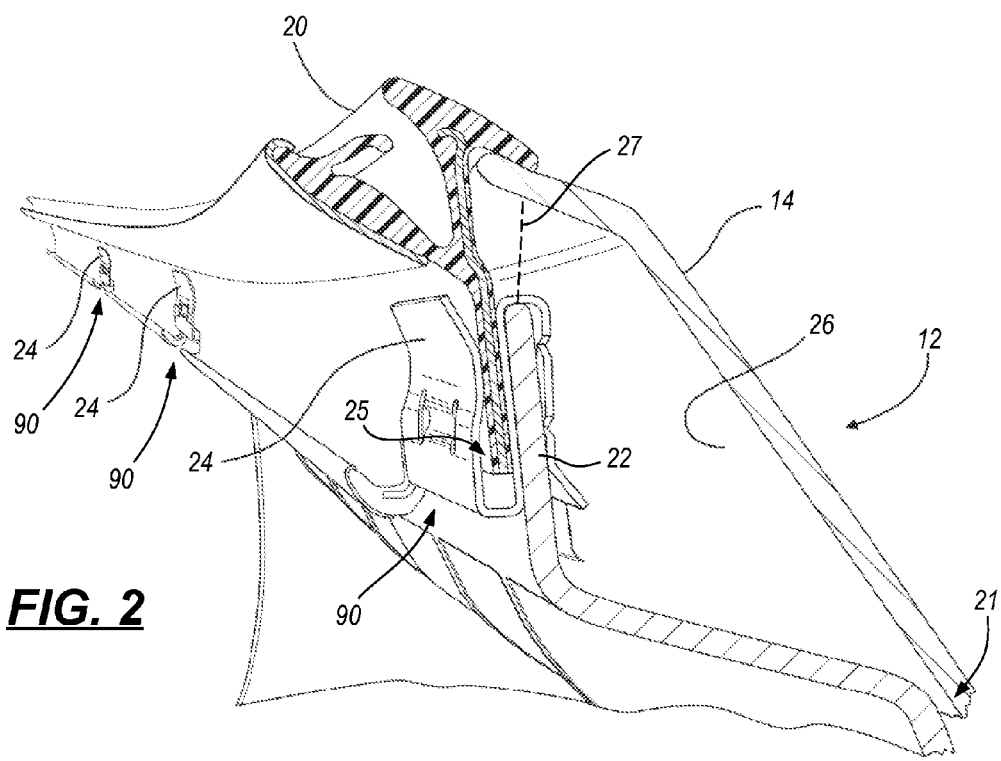
FIG. 2 is a schematic perspective view of a portion of a vehicle door assembly.

FIG. 2 schematically illustrates an embodiment of the outer belt molding 20 being held against the outer body panel 14 of the door assembly 12, while being secured to an upstanding end portion of a flange (herein referred to as the upstanding flange 22) using a plurality of clips 24. As shown, each clip 24 may extend over and be secured to the upstanding flange 22, and may have a molding receiving portion 25 configured to receive the outer belt molding 20. Both the outer body panel 14 and the upstanding flange 22 may be formed from a sheet molded compound (SMC) that may, for example, include a fiber-reinforced polyester. Alternatively, the outer body panel 14 and/or upstanding flange 22 may be formed from a stamped sheet metal, such as, for example, aluminum or steel. As illustrated, the upstanding flange 22 may be located on an inward facing side 26 of the outer body panel 14, and may be secured to the outer body panel 14 away from the molding 20 (e.g., at 21) though the use of an adhesive and/or one or more screws, bolts, rivets, and/or welds. In one configuration, the upstanding flange 22 may serve to reinforce the outer body panel 14 from deflecting into/out of and/or up/down relative to the door assembly 12. Additionally, as shown, the end of the upstanding flange 22 may be separated from the outer body panel by a distance 27.

FIG. 3 illustrates a schematic cross-sectional view of the outer belt molding 20 in an as-manufactured state; while FIG. 4 generally illustrates a schematic cross-sectional view of the outer belt molding 20 assembled in the door assembly 12 and contacting a window pane 18. As generally identified in FIG. 3, the outer belt molding 20 includes an extended body portion 30 that generally includes a first end 32 and a second end 34, and may generally be oriented along a body axis 36 (i.e., defined in the cross-sectional view). A cap 38 may be disposed at the first end 32 of the body portion 30, and may be wider than the body portion 30. Likewise, an anti-rattle bumper 40 may be disposed at the second end 34 of the body portion 30, and may generally extend out from the body portion 30 toward the window pane 18 (i.e., away from the body axis 36).

A window sealing arm 50 may be compliantly coupled to the body portion 30 of the outer belt molding 20 at a location between the cap 38 and the anti-rattle bumper 40. The window sealing arm 50 may be generally situated along an arm axis 52 that may be at an angle 54 to the body axis 36 of the body portion 30. In one embodiment, the angle 54 formed by the window sealing arm 50 and the first end 32 of the body portion 30 may be an acute angle.

The interface between the window sealing arm 50 and body portion 30 of the outer belt molding 20 may include a first compliant joint 56 that may permit the window sealing arm 50 to elastically pivot about the joint 56. In one configuration, the joint 56 may include a portion of the window sealing arm 50 that is narrower than the remainder of the arm to facilitate localized bending. In this manner a transverse load applied to the arm 50 may cause an angular elastic strain to occur predominantly at the narrowed portion of the joint 56.

A body sealing arm 60 may be compliantly coupled to the window sealing arm 50, and may extend outward from the window sealing arm 50 in a direction generally toward the body portion 30 of the belt molding 20. The body sealing arm 60 may be generally articulable about a second compliant joint 62 at the base of the body sealing arm 60. When a surface of the window sealing arm 50 makes contact with the window pane 18, as generally illustrated in FIG. 4, the pane 18 may urge the window sealing arm 50 to articulate about the first compliant joint 56 toward the cap 38. During this motion, the body sealing arm 60 may contact the base portion 30 of the molding 20, which may urge the body sealing arm 60 to generally articulate about the second compliant joint 62 toward the window sealing arm 50. While rotating, the body sealing arm 60 may remain in contact with the body portion 30, and may impede liquid from flowing between window sealing arm 50 and the base portion 30, toward the first compliant joint 56.

The outer belt molding 20 may be constructed from a polymeric material that may have suitable characteristics to promote sealing between the various components. For example, the molding 20 may be made from a polypropylene material. Alternatively, the molding 20 may be made from a thermoplastic elastomer (TPE), thermoplastic vulcanizate (TPV), a vulcanized rubber material (EPDM) or any other similar material. In one configuration, the body portion 30 may be constructed from a polymeric material having a different hardness than the window sealing arm 50 (and body sealing arm 60) and/or anti-rattle bumper 40. For example, the cap 38 and body portion 30 of the molding 20 may have a durometer value of approximately 75-90 on the Shore-A scale (measured according to ASTM standard D2240). Conversely, the window sealing arm 50 (and body sealing arm 60) and/or the anti-rattle bumper 40 may have a durometer value of approximately 60-70 on the Shore-A scale. By fabricating the cap 38 and body portion 30 from a harder durometer material, it may provide increased structural rigidity to the molding 20, while the softer window sealing arm 50 and/or anti-rattle bumper 40 may be more configured for compliant contact with the window pane 18.

In one configuration, a structural carrier 70 may be disposed within the body portion 30. The carrier 70 may be a metallic element (e.g., aluminum), or may be formed from a sufficiently hard polymer. The carrier 70 may serve to further enhance the structural rigidity of the body potion 30 to resist buckling during installation and/or torsional deflection during use. As illustrated, the carrier 70 may partially extend within both the cap 38 and the anti-rattle bumper 40 to reinforce those portions as well.

A portion of the window sealing arm 50 and/or the anti-rattle bumper 40 may be covered with a flock material 64 to dampen the contact interface with the window pane 18 and/or provide aesthetic qualities. The flock material 64 may be a polyester, nylon, or acrylic flock, and may generally be adhered to the surface of the window sealing arm 50/bumper 40 using a suitable adhesive. The flock material 64 may permit the window pane 18 to freely slide against the belt molding 20 without any undesirable amount of contact friction (i.e., the flock material 64 may reduce the coefficient of static and/or dynamic friction between the pane 18 and the molding 20).

In an installed state, as generally illustrated in FIG. 4, the molding 20 may be held against the upstanding flange 22 using a plurality of clips 24. Each clip 24 may be made from, for example, a spring-steel type material, and may apply a compressive force (generally indicated at 80 in FIG. 4) to the base portion 30 of the molding 20. Furthermore, as illustrated in FIGS. 4 and 5, each clip may include one or more inwardly bent tabs 82 or barbs that may prevent easy extraction of the molding from the clip 24. Each tab 82 may be bent inward, and at an angle such that the molding 20 may enter the clip 24 with relative ease, though may catch on the tab 82 if removal is attempted. Once installed, the compressive force 80 may cause the tabs 82 to penetrate/impress into the polymeric material of the molding 22 through local deformation and/or compression of the material. This local deformation may further prevent removal of the molding 20.

The clip 24 may include one or more similar inward-bent tabs 84 or spurs on the side adjacent the upstanding flange 22. In this manner, removal of the clip 24 from the flange 22 may be impeded through the point or line contact between the tabs 84 and the flange 22. In one configuration, the tabs 84 may locally deform the flange 22 at the site of contact to further prevent removal of the clip 24 from the flange 22.

During installation, a plurality of clips 24 may be slid over the end of the upstanding flange 22 at periodic intervals across the door assembly 12. In one configuration, between four and six clips 24 may be positioned on the flange 22. The flange 22 may include one or more locating features (not shown) to aid in positioning the clips 24 along the flange 22 at the proper spacing.

Following the installation of the plurality of clips 24 on the flange 22, the body portion 30 molding 20 may be slid into the clips 24 by positioning the molding 20 against the clips 24, and applying a load substantially aligned with the body axis 36 of the molding 20. This load may cause the molding 20 to enter the clips 24 until the cap 38 contacts the outer body panel 14. As generally shown in FIGS. 2 and 4, the cap 38 may overhang the outer body panel 14 by a predetermined amount to allow liquid, such as rain water, to flow down over the cap 38 and onto the outer body panel 14. In this configuration, the outer belt molding 20 may be securely coupled via the body portion 30 to the upstanding flange 22 in a positionally stable manner. Additionally, the extended length of the body portion 30 (e.g., more than three times the width of the cap 38) may enhance the stability of the molding 20 against the flange 22.

To permit the molding 20 to be fully depressed into each clip 24, the anti-rattle bumper 40 may be notched and/or locally removed at each location 90 where a clip 24 is expected to be engaged (as generally illustrated in FIGS. 2 and 6). In this manner, each clip 24 may directly apply a compressive force 80 directly to the body portion 30 of the molding 20, without any interference by the bumper 40. Each notch in the molding 20 may permit the anti-rattle bumper 40 to be substantially independent from and/or uninfluenced by the clip 24.

In addition to the clips 24, in one configuration, the molding 20 may also be secured to the upstanding flange 22 via one or more mounting holes 92. Each mounting hole 92 may allow one or more screws, bolts, barbs, rivets, or other fasteners (not shown) to secure the molding 20 to the flange 22. In one configuration, at least one such fastener may pass through the mounting hole 92 in the molding 20 and through a similar hole in the flange 22 to prevent any movement of the molding 20 along the door assembly 12.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A vehicle door assembly comprising:
    an outer body panel;
    a flange disposed on an inward facing side of the outer body panel, the flange including a first end portion secured to the body panel, and an upstanding end opposite the first end portion that is separated from the outer body panel, the upstanding end being more proximate to a window opening than the first end portion;
    a plurality of clips secured over the upstanding end of the flange such that each of the plurality of clips extends around the upstanding end and to opposing sides of the flange and applies a compressive load thereto, each of the plurality of clips including a molding receiving portion;
    an outer belt molding including:
        a body portion having a first end and a second end;
        a cap disposed at the first end of the body portion;
        an anti-rattle bumper disposed at the second end of the body portion;
        a window sealing arm compliantly coupled to the body portion at a location between the cap and the anti-rattle bumper, wherein the window sealing arm forms an acute angle with the first end of the body portion; and
        a body sealing arm compliantly coupled to the window sealing arm and extending toward the body portion; and
    wherein a portion of the body portion of the outer belt molding is configured to slide into and be held within the molding receiving portion of each of the plurality of clips such that the plurality of clips couple the molding with the upstanding end of the flange.

2. The vehicle door assembly of claim 1, further including a window pane;
    wherein the window sealing arm of the outer belt molding is configured to contact the window pane;
    wherein contact with the window pane is configured to urge the window sealing arm to articulate between a first position and a second position relative to the body portion; and
    wherein the body sealing arm is configured to contact the body portion when the window sealing arm is in the second position.

3. The vehicle door assembly of claim 2, wherein the body sealing arm is configured to be separate from the body portion when the window sealing arm is in the first position.

4. The vehicle door assembly of claim 2, wherein contact between the body sealing arm and the body portion is configured to urge the body sealing arm to articulate towards the window sealing arm.

5. The vehicle door assembly of claim 1, wherein the window sealing arm, the cap, and the body portion of the outer belt molding are each formed from a polymeric material; and wherein the polymeric material of the window sealing arm has a lower durometer hardness than the polymeric material of the cap and the body portion.

6. The vehicle door assembly of claim 1, wherein the outer belt molding further includes a metallic carrier disposed within the body portion.

7. The vehicle door assembly of claim 6, wherein the metallic carrier extends into at least one of the cap and the anti-rattle bumper of the outer belt molding.

8. The vehicle door assembly of claim 1, wherein the cap of the outer belt molding is configured to contact and overhang the outer body panel by a predetermined amount.

9. The vehicle door assembly of claim 1, wherein each of the plurality of clips is configured to apply a compressive force to each of the body portion of the outer belt molding and the upstanding end of the flange.

10. The vehicle door assembly of claim 9, wherein each of the plurality of clips includes a barb, and wherein the compressive force applied to the outer belt molding is configured to impress the barb into the body portion of the outer belt molding.

11. The vehicle door assembly of claim 1, wherein the plurality of clips are disposed at spaced intervals along the upstanding end of the flange, and wherein the anti-rattle bumper of the outer belt molding is notched at a plurality of locations according to the spaced intervals to allow the clips to contact the body portion.

12. The vehicle door assembly of claim 9, wherein each of the plurality of clips includes a barb, and wherein the compressive force applied to the upstanding end of the flange is configured to impress the barb into the upstanding end of the flange.

13. The vehicle door assembly of claim 1, wherein the body portion defines a body axis extending between the first end and the second end; and
    wherein the body portion of the outer belt molding is configured to be urged into the molding receiving portion of each of the plurality of clips through the application of force to the outer belt molding that is substantially aligned with the body axis.

14. The vehicle door assembly of claim 13, wherein the cap of the outer belt molding is configured to contact and overhang the outer body panel by a predetermined amount; and
    wherein the body portion of the outer belt molding is restrained from further insertion into the molding receiving portion of each of the plurality of clips upon contact between the cap of the outer belt molding and the outer body panel.

* * * * *